United States Patent
Rina

(10) Patent No.: US 9,522,412 B2
(45) Date of Patent: Dec. 20, 2016

(54) APPARATUS FOR THE PAINTING OF HULLS OF BOATS OR THE LIKE

(76) Inventor: Vincenzo Rina, Policoro (IT)

( * ) Notice: Subject to any disclaimer, the term of this patent is extended or adjusted under 35 U.S.C. 154(b) by 805 days.

(21) Appl. No.: 13/825,442

(22) PCT Filed: Sep. 21, 2011

(86) PCT No.: PCT/IB2011/002187
§ 371 (c)(1),
(2), (4) Date: May 22, 2013

(87) PCT Pub. No.: WO2012/038806
PCT Pub. Date: Mar. 29, 2012

(65) Prior Publication Data
US 2013/0243963 A1   Sep. 19, 2013

(30) Foreign Application Priority Data
Sep. 21, 2010   (IT) .............. MO2010A0263

(51) Int. Cl.
*B05C 11/10* (2006.01)
*B05B 13/00* (2006.01)
(Continued)

(52) U.S. Cl.
CPC ......... *B05C 11/1018* (2013.01); *B05B 13/005* (2013.01); *B05B 15/0406* (2013.01);
(Continued)

(58) Field of Classification Search
CPC .... B05B 15/0425; B05B 13/005; B05C 11/10; B05C 11/1015; B05C 11/1013; B05C 11/1018; B05C 10/1018; B05C 10/1013; B25J 21/00
(Continued)

(56) References Cited

U.S. PATENT DOCUMENTS 4,649,672 A * 3/1987 Thomann .............. E04G 23/002
451/87
4,825,598 A * 5/1989 Schlick .................. B24C 3/065
451/132
(Continued)

FOREIGN PATENT DOCUMENTS

DE   43 28 410 A1   3/1995
DE   4328410 A1 *   3/1995 .............. B05B 1/28
(Continued)

OTHER PUBLICATIONS

International Search Report, dated Mar. 5, 2012, from corresponding PCT application.

*Primary Examiner* — Karl Kurple
(74) *Attorney, Agent, or Firm* — Young & Thompson

(57) ABSTRACT

Apparatus for painting hulls of boats includes at least an anthropomorphic robot having paint dispensing elements, at least a supporting body which defines a chamber for containing the robot and which includes at least an opening for applying paint on a reference surface, handling elements of the body along at least a direction of moving close to/away from the surface, air suction elements to form a suction stream substantially along the entire surrounding edge of the opening, according to a preset suctionable air flow, command and control elements operatively connected to the handling elements to control movement of the body along the moving direction, sensor elements associated with the body to detect the distance of the surrounding edge from the reference surface and operatively connected to the command and control elements, the latter being programmed to adjust the distance of the surrounding edge of the opening from the reference surface.

20 Claims, 5 Drawing Sheets

(51) Int. Cl.
*B05B 15/04* (2006.01)
*B25J 11/00* (2006.01)
*B25J 21/00* (2006.01)
*B05B 13/04* (2006.01)
*B63C 5/00* (2006.01)

(52) U.S. Cl.
CPC ...... *B05B 15/0425* (2013.01); *B05B 15/0431* (2013.01); *B05C 11/1013* (2013.01); *B25J 11/0075* (2013.01); *B25J 21/00* (2013.01); *B05B 13/0431* (2013.01); *B63C 5/00* (2013.01)

(58) Field of Classification Search
USPC ............ 118/677, 678, 326, 64, 505, DIG. 7; 700/282, 283, 123, 13
See application file for complete search history.

(56) References Cited

U.S. PATENT DOCUMENTS

| | | | |
|---|---|---|---|
| 4,890,567 A | 1/1990 | Caduff | |
| 5,095,811 A * | 3/1992 | Shutic | B05B 15/1211 118/326 |
| 5,165,969 A * | 11/1992 | Barlett | B05B 15/1207 118/326 |
| 5,173,118 A * | 12/1992 | Josefsson | B05B 15/1222 118/309 |
| 5,309,683 A | 5/1994 | Hockett | |
| 5,355,823 A * | 10/1994 | Goldbach | B05B 15/1296 114/222 |
| 5,367,841 A * | 11/1994 | Smith | B24C 3/062 451/87 |
| 5,398,632 A * | 3/1995 | Goldbach | B63B 59/06 114/222 |
| 5,529,815 A * | 6/1996 | Lemelson | C23C 16/04 118/720 |
| 5,688,323 A * | 11/1997 | Kane | B05B 13/005 118/326 |
| 6,189,473 B1 * | 2/2001 | Appel | B05B 13/005 114/222 |
| 6,315,648 B1 * | 11/2001 | Neer | B24C 3/062 451/75 |
| 6,365,221 B1 * | 4/2002 | Morton | B05B 12/00 427/140 |
| 8,726,833 B2 * | 5/2014 | Logan | B05B 15/001 118/313 |
| 8,770,143 B2 * | 7/2014 | Endo | C23C 16/4412 118/326 |
| 9,216,433 B2 * | 12/2015 | Hasebe | B05B 13/0228 |
| 2005/0196543 A1 * | 9/2005 | Morton | B05B 12/124 427/421.1 |
| 2006/0011747 A1 * | 1/2006 | Jahnke | B05B 15/0406 239/370 |
| 2009/0224066 A1 * | 9/2009 | Riemer | B05B 17/063 239/102.2 |
| 2012/0138207 A1 * | 6/2012 | Ortlieb | B05D 5/005 156/64 |
| 2013/0119155 A1 * | 5/2013 | Braspenning | B05B 13/005 239/299 |

FOREIGN PATENT DOCUMENTS

| | | |
|---|---|---|
| DE | 197 38 962 A1 | 3/1999 |
| EP | 0 165 911 A2 | 12/1985 |
| JP | 59 154176 A | 9/1984 |
| JP | 6 269709 A | 9/1994 |
| WO | 01/34309 A2 | 5/2001 |

* cited by examiner

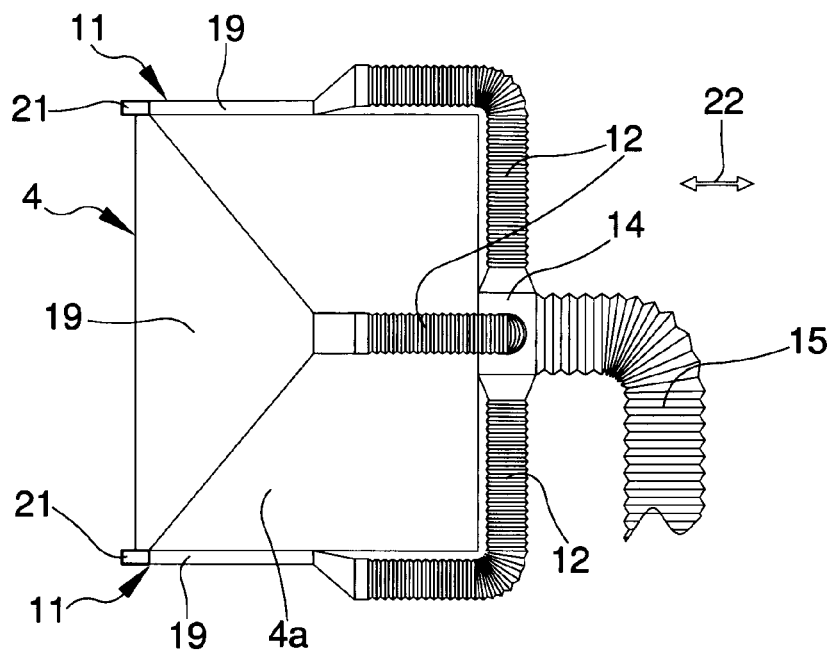
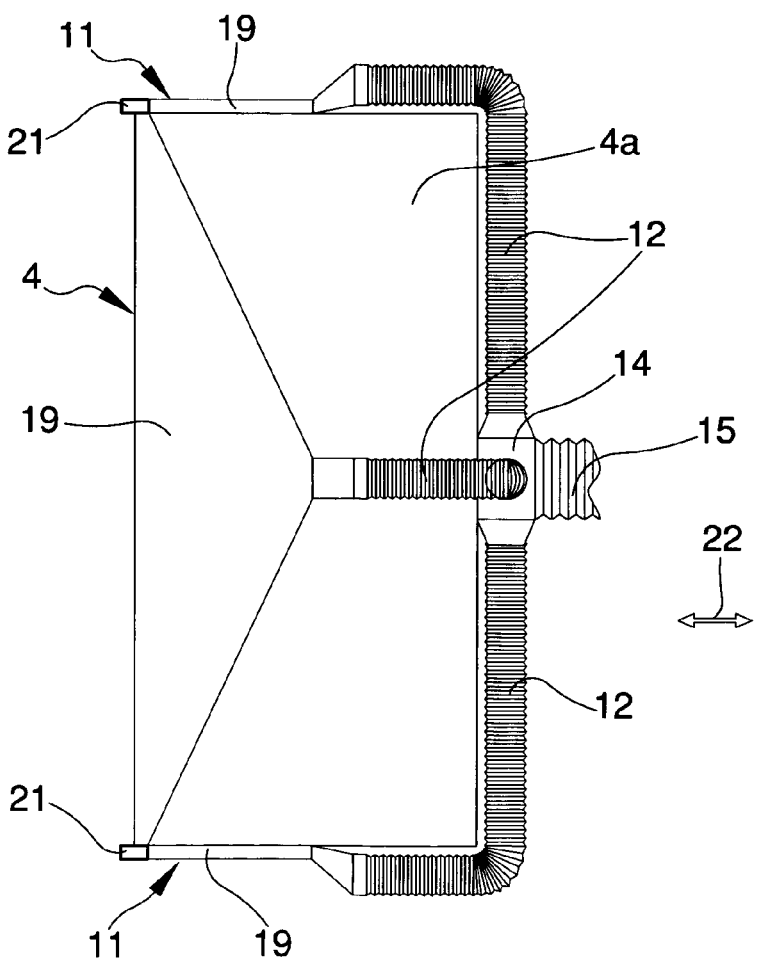

APPARATUS FOR THE PAINTING OF HULLS OF BOATS OR THE LIKE

TECHNICAL FIELD

The present invention relates to an apparatus and a method for the painting of hulls of boats or the like.

BACKGROUND ART

As the technician in the sector knows, the hulls of boats generally undergo a plurality of works which are intended to give them the desired aesthetic look such as, e.g., sanding, sandblasting, surfacing and painting.

Each stage must be performed with extreme care in order to avoid the presence of faults which can greatly affect the final aesthetic quality.

The present invention relates particularly, but not solely, to the execution of the painting stage, by means of which, on the hull already worked and theoretically without surface faults, a paint is applied to give its final aesthetic look.

Up to now, the painting stage is hand-made by an operator or using a number of tools suited to spray the paint on the intended surface.

As can be easily understood, hand-painting has a series of drawbacks.

It requires, in fact, long execution times which affect the final cost of working, and its successful outcome strongly depends on the skills of the operator performing it.

Also the painting made using a suitable tool for paint spraying has however a number of drawbacks.

The application of paint by spraying implies that a part of atomized particles of paint do not adhere to the surface to be painted, thus dispersing in the surrounding environment (this phenomenon being defined as "overspray").

Since the paints used for these applications generally contain toxic or polluting substances, it can be easily understood how their dispersion can be harmful to the environment and people who work in the vicinity of the painting area.

In this regard, in fact, recent community standards provide for more and more restrictive measures as far as the emission of such substances in the environment is concerned.

Some devices for the painting of hulls of boats or the like are known from DE 4328410, DE 19738962, JP 6269709 and WO 01/34309.

In particular DE 4328410 describes a device for the dispensing of paint or the like, wherein the nozzle (or nozzles) from which the dispensed product flows out is contained in a kind of cabin. Dispensing means are provided along the profile of the cabin of a liquid suited to capture the particles in excess of the dispensed product and which is suctioned through the relative suction means. This device does not allow an efficient and quick work of the surface to be worked, since the cabin and dispensing nozzle move integrally with one another and therefore both must be moved each time the working area must be modified.

Furthermore, this solution does not allow a correct dispensing of the product, since the liquid dispensed inside the cabin can interfere with the outflow of the paint, thus altering the working of the surface.

DE 19738962 describes a solution similar to the one of DE 4328410, wherein the product dispensing nozzle is arranged inside a containment cabin and moves integrally with it and wherein along the cabin profile a plurality of suction funnels are arranged.

This device also is difficult to use, as is DE 4328410, due to the frequent handling of the nozzles-cabin unit which must be done to work different areas of the above-mentioned surface.

Furthermore, it does not allow to obtain an efficient prevention of overspray, since it does not make any control of the air entering into the cabin.

Again, this solution is complex to be manufactured.

JP 6269709 describes a device in which the product dispensing element moves inside a relative containment cabin and in which a plurality of nozzles are provided suited to dispense pressurized air inside the cabin.

This solution, besides being very complex and costly from a manufacturing point of view, is also not much efficient, since besides not preventing the phenomenon of overspray, it also causes a high turbulence inside the cabin that jeopardizes the correct dispensing of the paint on the surface to be worked.

WO 01/34309 also describes a device for the dispensing of paint or the like, wherein the nozzle from which the dispensed product flows out is contained in a kind of cabin with air suction means.

WO 01/34309 also describes an embodiment in which the containment cabin has sensors suitable for adjusting the position of the nozzle for dispensing the product so as to keep it steady with respect to the surface to be worked.

This device also has a number of drawbacks. It is not so easy as it requires the continuous movement of the cabin-nozzle unit to intervene on different areas of the worked surface.

Furthermore, it does not allow an efficient prevention of overspray since it does not control the air flow rates, either the suctioned one and the one entering into the cabin.

It is therefore possible that situations may arise wherein one part of the dispensed product is suctioned by the suction means and others wherein the particles of dispensed product flow out of the cabin.

DESCRIPTION OF THE INVENTION

The main aim of the present invention is to provide an apparatus for the working of hulls of boats or the like which allows to greatly reduce the quantity of particles of the dispensed product, and therefore of the relative substances contained, which are dispersed in the environment during the working stage and which, at the same time, allows to make an efficient working.

Within this aim, an object of the present invention is to prevent the dispersion in the environment of the particles of the dispensed product without jeopardizing the application of the product itself.

One object of the present invention is to provide an apparatus which allows to work also very large surfaces without it being necessary to move the cabin inside which is positioned the product dispensing nozzle used for working, thus allowing to greatly reduce working times with respect to known devices.

Another object of the present invention is to provide an apparatus which is much simpler from the manufacturing point of view than the known devices and is practical to use.

Another object of the present invention is to provide an apparatus for the painting of hulls of boats or the like that allows overcoming the mentioned drawbacks of the state of the art in the ambit of a simple, rational, easy and effective to use as well as low cost solution.

The above mentioned objects are achieved by the present apparatus for the painting of hulls of boats or the like, characterized by the fact that it comprises:

- at least an anthropomorphic robot having dispensing means of the paint;
- at least a supporting body which defines a chamber for containing said robot and which comprises at least an opening suitable for allowing the application of the paint on a reference surface, said dispensing means having at least three degrees of freedom inside said chamber;
- handling means for handling said body along at least a direction of moving close to/away from said reference surface;
- air suction means comprising at least a suction mouth associated with said body to form a suction stream substantially along the entire surrounding edge of said opening, according to a preset suctionable air flow,
- command and control means operatively connected to said handling means to control the movement of said body along said direction of moving close/away;
- sensor means associated with said body to detect the distance of the surrounding edge of said opening from said reference surface and operatively connected to said command and control means, the latter being programmed to adjust the distance of the surrounding edge of said opening from said reference surface so as to keep the difference between the flow rate of air entering into the area between the surrounding edge of said opening and said reference surface and said preset suctionable air flow below a preset value.

BRIEF DESCRIPTION OF THE DRAWINGS

Other characteristics and advantages of the present invention will become more evident from the description of a preferred, but not sole, embodiment of an apparatus for the painting of hulls of boats or the like, illustrated purely as an example but not limited to the annexed drawings in which:

FIG. 6 is a side elevation view of the detail of FIG. 3;

FIG. 7 is a view from above of the detail of FIG. 3.

EMBODIMENTS OF THE INVENTION

Figure 1:
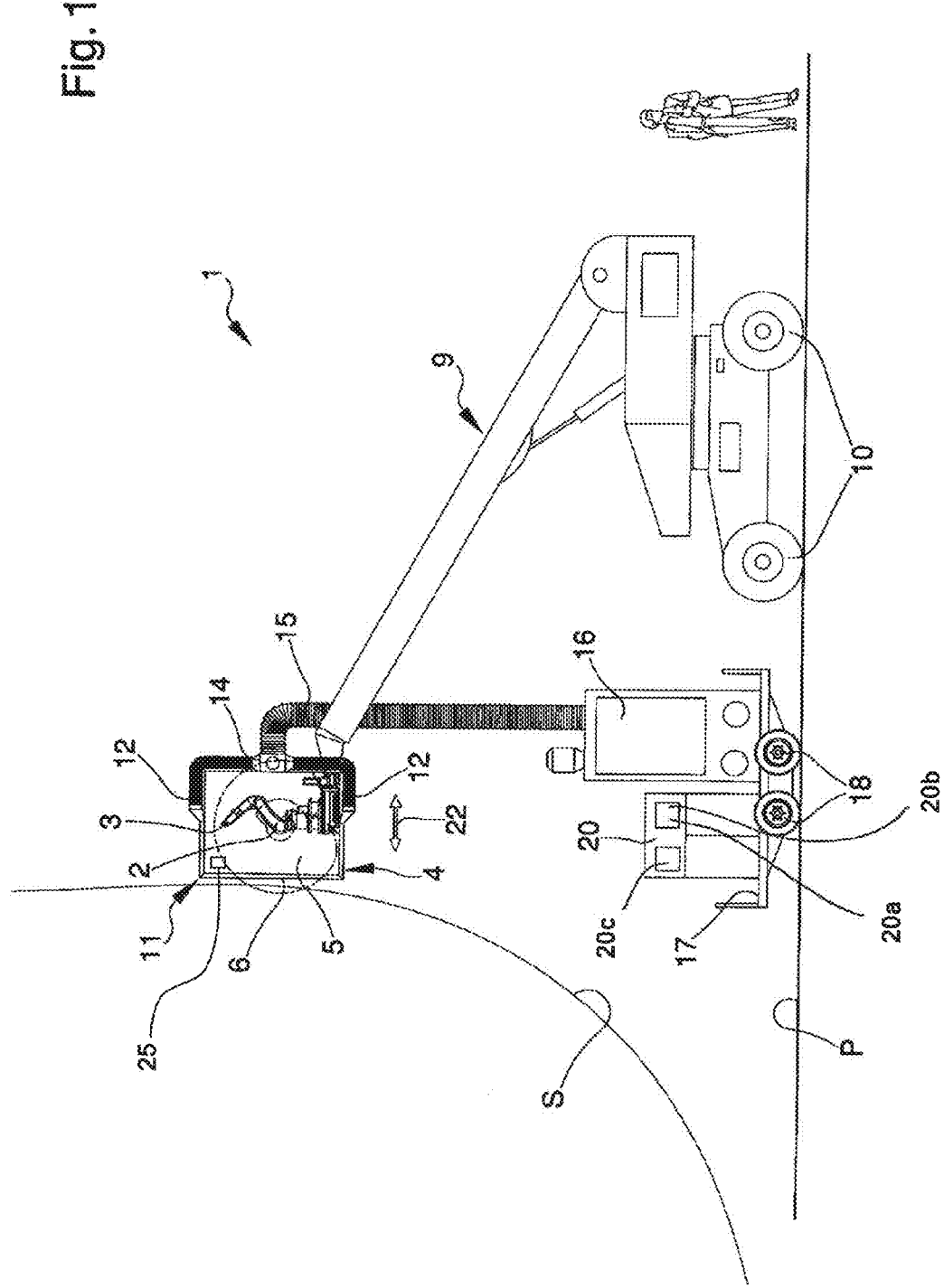
FIG. 1 is a side elevation view of the apparatus according to the invention.
Figure 2:
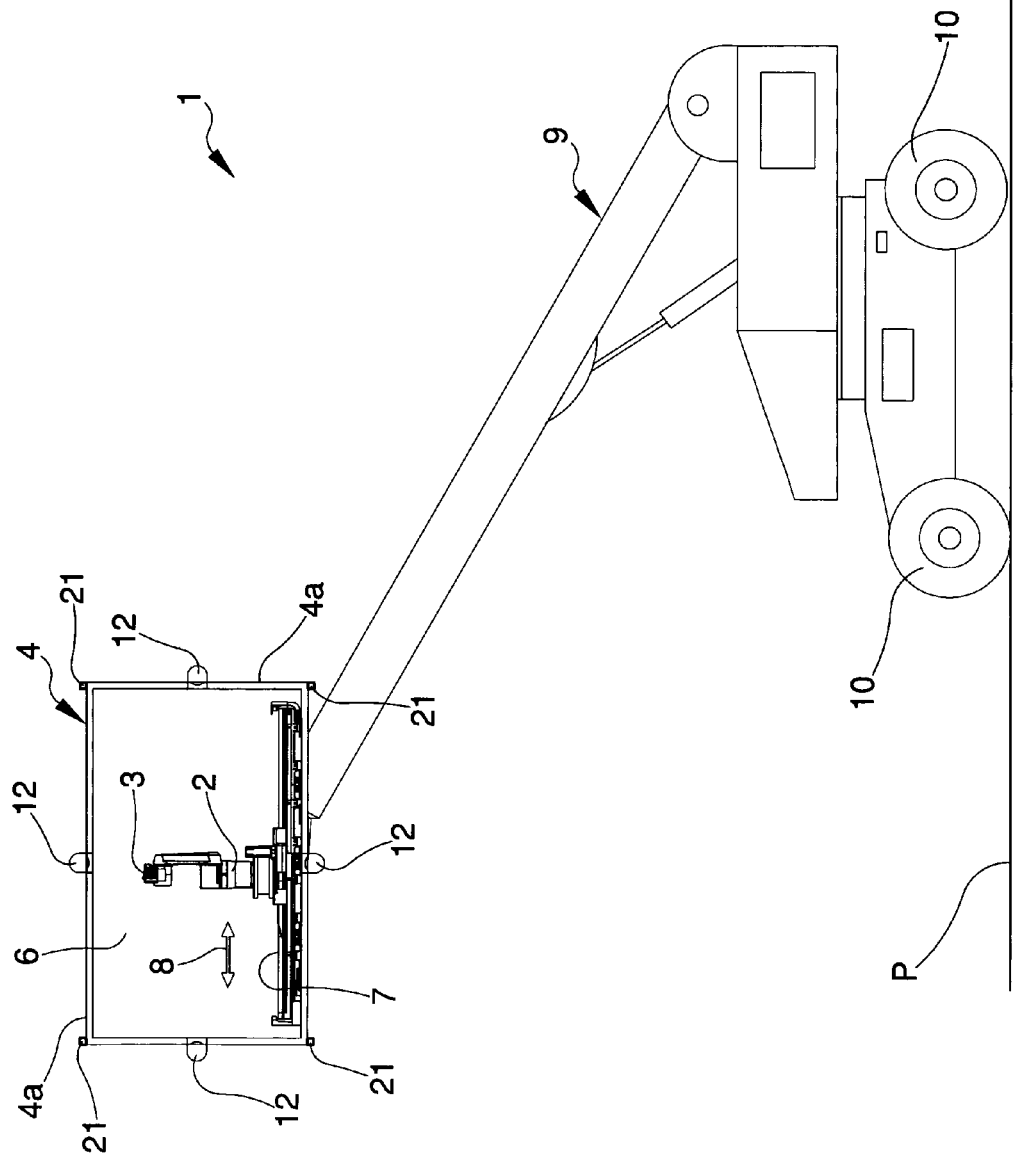
FIG. 2 is a front elevation view of a part of the apparatus of FIG. 1.
Figure 3:
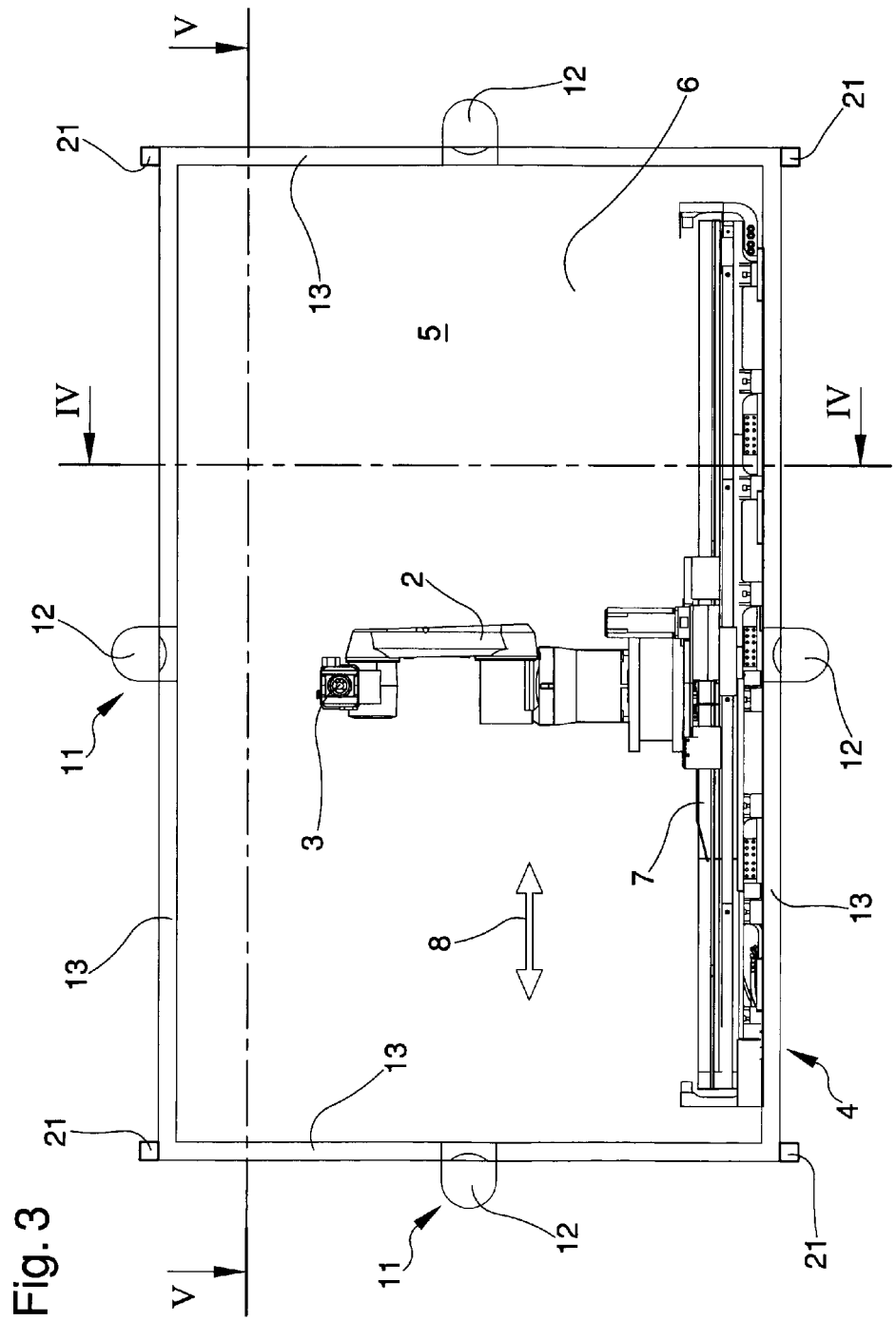
FIG. 3 is an enlarged view of a detail of the apparatus of FIG. 2.
Figure 4:
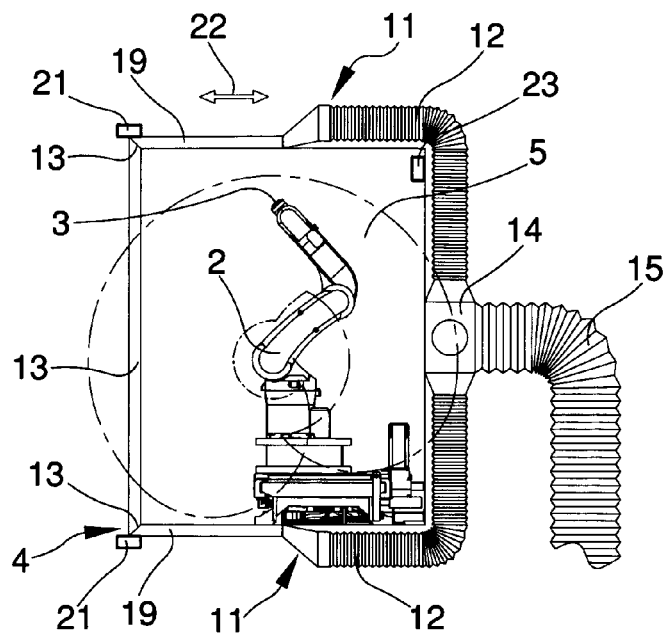
FIG. 4 is a section view along the IV-IV track plane of FIG. 3.
Figure 5:
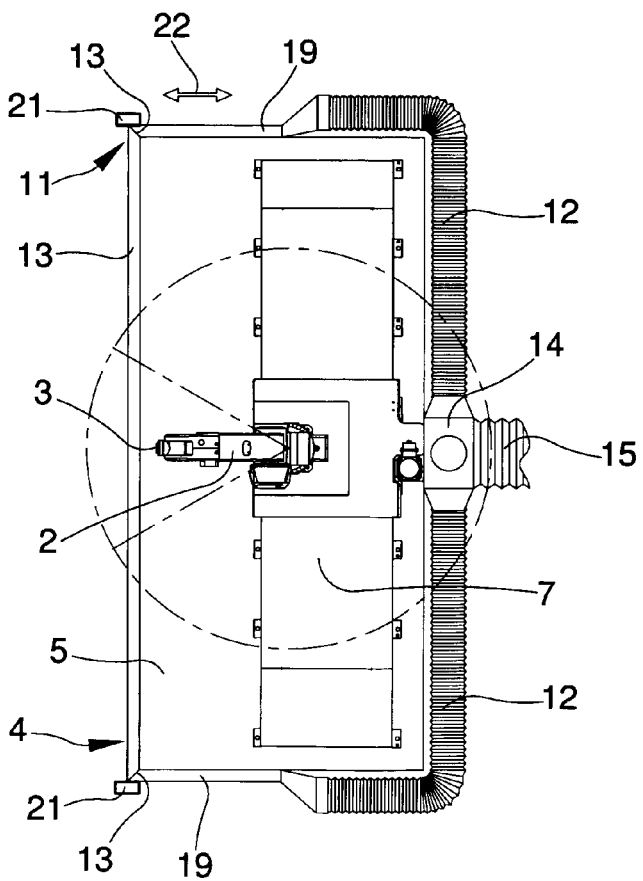
FIG. 5 is a section view along the V-V track plane of FIG. 3.

With particular reference to such illustrations, globally indicated by 1 is an apparatus for the painting of hulls of boats or the like.

According to the invention, the apparatus 1 comprises an anthropomorphic robot 2 having dispensing means 3 of the paint and a supporting body 4 which defines a chamber 5 for containing the robot 2, wherein the dispensing means 3 are mobile inside the chamber 5 according to at least three degrees of freedom. The chamber 5 is such as to completely contain the robot 2 which, by definition of anthropomorphic robot, has at least four degrees of freedom.

As can be seen in the enclosed illustrations, the dispensing means 3 are therefore released from the chamber 5. In the embodiment shown in the illustrations, the dispensing means 3 are able to reach any point in space inside the chamber 5.

The dispensing means 3 can be suitably connected to a tank for collecting the paint not shown in detail in the illustrations.

The body 4 has at least one opening 6 suitable for allowing the application of the paint on a reference surface S such as, e.g., the hull of a boat.

Advantageously, between the robot 2 and the body 4 are placed translatory means 7 of the robot itself.

More particularly, the translatory means 7 are suitable for allowing the translation of the robot 2 along a predefined direction, shown by the double arrow 8 in the illustrations.

The apparatus 1 then comprises handling means 9,10 of the body 4 along at least a direction of moving close to/away from the reference surface S, wherein this direction is shown in the illustrations with reference number 22.

More in detail, in the embodiment shown in the illustrations, the handling means 9,10 comprise lifting means 9 arranged resting on a supporting surface P and suitable for moving the body 4 along a lifting direction which is sloped with respect to the horizon. Such lifting direction is also preferably sloped with respect to the vertical, so it has an horizontal and a vertical component part. The movement of the body 4 along the lifting direction, besides varying its working height with respect to such supporting surface P also implies the body itself moving close to/away from the reference surface S. The lifting means 9 suitable for moving vertically the body 4 cannot however be ruled out.

The handling means 9,10 also comprise first movement means 10 with respect to the supporting surface P. Suitably, the movement means 10, e.g. made up of a plurality of wheels, are directionally released with respect to the supporting surface P.

The movement of the body 4 along the direction of moving close/away 22 can therefore be due to the effect of just one between the lifting means 9 and the first movement means 10, or to the joined effect of both.

The apparatus 1 then comprises air suction means 11 comprising at least a suction mouth 13 associated with the body 4 to define a suction stream substantially along the entire surrounding edge of the opening 6, where the air flow rate which can be suctioned through the suction means is preset.

The suction means 11 are suitable for preventing the residues of the paint applied onto the reference surface S and not adhering to such surface from escaping outside.

Suitably, the suction stream produced by the suction means 11 is directed from the inside to the outside of the chamber 5.

Preferably, the suction mouth 13 is arranged substantially along the entire surrounding edge that delimits the opening 6.

More particularly, the suction mouth 13 extends along the entire surrounding edge of the opening 6 without interruption. Nevertheless, alternative embodiments cannot be ruled out wherein the suction means 11 have a plurality of suction mouths 13 arranged adjacent to one another along the surrounding edge of the opening 6.

In a preferred embodiment, the body 4 is substantially parallelepiped-shaped with the opening 6 defined on one of its walls 4a. Suitably, the suction mouth 13 is arranged in correspondence to at least a section of the surrounding edge of each of the walls 4a which delimit the opening 6, preferably along the entire surrounding edge of each of the walls 4a. The suction mouth 13 is defined in correspondence to the thickness of the walls 4a.

More in detail, the suction means 11 comprise one or more suction ducts 12 communicating with the suction mouth 13 and associated with at least one of the walls 4a adjacent to the wall on which the opening 6 is defined. More in detail, each suction duct 12 is associated with a relative wall 4a which delimits the opening 6, outside the chamber 5.

The suction means 11 comprise, therefore, four suction ducts 12, communicating with the suction mouth 13 or with respective suction mouths 13 adjacent to one another, each of which is integrally associated with a respective wall 4a delimiting the opening 6.

Advantageously, each of the walls 4a defines inside it, in the proximity of the relative surrounding edge, an interspace 19 communicating with the suction mouth 13, where each interspace 19 defines at least in part a relative suction duct 12. As can be seen in FIGS. 6 and 7, each interspace 19, which communicates with the suction mouth 13 or with a relative suction mouth 13, has an increasing section towards the suction mouth itself.

In this embodiment, the remaining part of the suction ducts 12 is integrally associated with the body 4, outside the chamber 5. Different embodiments cannot however be ruled out in which the suction ducts 12 are at least partially contained inside the chamber 5.

Suitably, the suction ducts 12 flow into a manifold 14 arranged outside the body 4 and associated with a main pipe 15 which is connected in turn to a suction unit 16.

Advantageously, the apparatus 1 also comprises a supporting element 17 of the suction unit 16 arranged resting on the supporting surface P and having second movement means 18, e.g. consisting of wheels.

The suction unit 16 is also mobile with respect to the supporting surface P in such a way as to follow the movements of the body 4, and therefore of the robot 2 more easily, and to reach at ease all the areas of the reference surface S to be painted.

Preferably, the apparatus 1 also comprises recovery means (not shown in the illustrations) of the paint which remains inside the chamber 5 at the end of the painting stage. Such recovery means generally comprise at least a recovery mouth that faces onto the inside of the chamber 5.

The apparatus 1 also comprises command and control means 20 operatively connected to the handling means 9,10 to move the body 4 along the direction 22 of moving close to/away from the reference surface S.

The apparatus 1 comprises sensor means 21 associated with the body 4 to detect the distance of the surrounding edge of the opening 6 from the reference surface S and operatively connected to the command and control means 20. The command and control means 20 are programmed to adjust the distance of the surrounding edge of the opening 6 from the reference surface S (detected by the sensor means 21) in such a way that the difference between the flow rate of air entering into the area between the surrounding edge of the opening 6 and the reference surface S and the preset suctionable air flow is lower than a preset value.

Such preset value, which can be calculated or obtained by means of empirical testing, is such that none of the particles of paint that haven't adhered to the reference surface S escapes to the outside thus dispersing in the environment and at the same time the suction stream does not interfere with the painting of the surface by creating turbulence inside the chamber 5 or by suctioning a part of the dispensed paint. Preferably, the command and control means 20 are programmed to make the flow rate of the air entering into the area between the surrounding edge of the opening 6 and the reference surface S substantially the same (unless any tolerance of the instruments used) as the preset suctionable air flow. In this preferred embodiment, therefore, the air flow rate which is suctioned by the suction means 11 substantially corresponds to the flow rate of the air entering into the chamber 5.

The command and control means 20 are therefore suitable for calculating the air flow entering into the area placed between the body 4 and the reference surface S according to the distance detected by the sensor means 21, for calculating the difference between the calculated inlet air flow and the preset suctionable air flow and for modifying accordingly the distance of the body 4 from the reference surface S when such difference is bigger than the preset value. It is known to the expert of the field that the value of flow rate (meaning the volumetric flow rate) depends on the speed of the fluid and on the section crossed-by. In this case the speed of the fluid, i.e. air, is that defined by the suction means 11 and, therefore, known (in fact, by setting one or more values of the suctionable air flow and being known the section of the pipes crossed-by, the corresponding air speed values can therefore be known). It follows that, the fluid speed being known, in order to modify the inlet air flow it is necessary to modify the area of the section crossed by the air flow, which corresponds to the area of the zone placed between the surrounding edge of the opening 6 and the reference surface S.

More particularly, the command and control means 20 comprise an electronic unit 20a operatively connected to at least the handling means 9,10 and the command and control means 20 comprise at least a memory 20b, operatively connected to the electronic unit, which can be preset with one or more values of the suctionable air flow by means of the suction means 11.

Preferably, in particular when the memory 20b contains at least two preset values of the suctionable air flow, e.g. one for the painting stages and one for the sandblasting stages, the command and control means 20 also comprise interface 20c means operatively connected to the electronic unit and usable to select manually one of the preset values in the memory.

Advantageously, the command and control means 20 are also operatively connected to the suction means 11 to command their start and to adjust the suctionable air flow depending on the preset value selected by the operator. By so doing an operator can select a predefined value of the suctionable air flow by operating on the interface means and the electronic unit operates in turn on the suction means 11 to adjust the suctioned air flow according to the predefined value selected by the operator.

Furthermore, the values of air speed can be set in the memory corresponding to each preset value of the suctionable air flow or the values relating to the sizes of the suction ducts 12 (in particular of the area of the sections crossed by the suctioned air) from which the speed of suctioned air can be easily calculated, if flow rate is known.

Preferably, the command and control means 20 are also suitable for controlling other functions of the robot 2 such as, e.g., its movements and the distance of the dispensing means 3 from the reference surface S.

Advantageously, through the command and control means 20 it is also possible to adjust the ratio between the flow rate of paint dispensed through the dispensing means 3 and the flow rate of air suctioned by the suction means 11. Suitably, also the command and control means 20 are positioned on the supporting element 17.

Advantageously, the apparatus 1 also comprises means for detecting the temperature and/or humidity 25 inside the chamber 5, and heating means 23 arranged inside the chamber itself and which can be started to modify the temperature and/or humidity detected.

More in detail, it is known that each paint has optimum chemical/physical properties within a relative temperature and/or humidity range. For each type of paint used it is therefore possible to set, for example in the programmable memory of the command and control means 20, a reference value for the temperature and/or humidity.

Suitably, the detection means and the heating means 23 are operatively connected to the command and control means 20, in inlet and outlet respectively, which are programmed to adjust the temperature of the heating means according to the detected value of temperature and/or humidity and to the preset reference value of temperature and/or humidity. More particularly, the command and control means 20 are suitable for operating on the heating means 23 to keep the difference between the detected value of temperature and/or humidity and the reference value of temperature and/or humidity below a predefined value.

Preferably, also in this case, such predefined value is more or less zero (unless any tolerance of the instruments used).

The operation of the equipment in the execution of the procedure according to the invention comprises at least a stage of setting at least a value of suctionable air flow through the suction means 11. Such setting stage can e.g. be performed by an operator through the above-mentioned interface means.

If several values of suctionable air flow are set, the electronic unit is programmed to read only the value each time set and selected by the operator.

Then, the distance is detected of the surrounding edge of the body 4 which delimits the opening 6 from the reference surface S. Suitably, this detection stage is performed by the sensor means 21, which send a corresponding signal to the command and control means 20 and in particular to the electronic unit.

The distance so detected is used to calculate the inlet air flow through the area placed between the body 4 and the reference surface S. The inlet air flow is calculated by the command and control means 20 using the value of the suctioned air speed corresponding to the preset suctionable air flow. The value of the suctioned air speed is known and can be set in the memory of the command and control means 20 or can be easily obtained from the electronic unit once the dimensions (and therefore the section) of the suction ducts 12 and the preset value of the suctionable air flow are known. The value of the suctioned air speed is therefore that which must be applied to the suction means 11 to achieve the preset suctionable air flow, the section of the relative ducts being fixed.

The value of the inlet air flow is then compared with the predefined value of the suctionable air flow and, if the difference between these is higher than a preset value, the position of the body 4 has to be adjusted with respect to the reference surface S in such a way as to increase or decrease the inlet air flow and bring the difference between the above-mentioned flow rate values below the preset value.

Until the difference between the two flow rate values remains below the preset value, the position of the body 4 remains unchanged.

The movement of the body 4 in order to adjust the value of inlet air flow is controlled by the command and control means 20 which operate on the movement means 9,10 so as to move the body close to or away from the reference surface S depending on the need to reduce or increase, respectively, the inlet air flow.

These operations must be repeated each time the working area of the reference surface S is modified, since different profiles implying an alteration of the distance from the body 4 generally correspond to different areas.

It is obvious that it is necessary to modify the distance of the body 4 from the reference surface S according to the methods described above also each time the type of work performed is changed, for example passing from painting to sandblasting or vice versa, thus modifying the value of the suctionable air flow. In the same way, also the supporting element 17 is moved so as to approach the command and control means 20 and the suction unit 16 to the working area of the robot 2.

During the painting of a working area of the reference surface S, the body 4 remains still while the dispensing means 3 move inside it.

Furthermore, again during the execution of the painting stages the command and control means 20 adjust, in a substantially continuous way or at preset time intervals, the temperature of the heating means 23 according to the temperature and/or humidity detected by the detection means. The command and control means 20 perform therefore a retroaction on the heating means 23 by adjusting each time their temperature according to the value read by the detection means. More particularly, the electronic unit is suitable for increasing or reducing the temperature of the heating means 23 so that the difference between the value of the temperature and/or humidity detected and the reference value is lower than a preset value.

Through the command and control means 20 the ratio is then adjusted between the flow rate of paint and that of air, so as to optimize the quantity of the dispensed paint and consequently obtain an efficient painting.

It has in practice been seen how the described invention achieves the proposed objects and in particular the fact is underlined that by controlling the distance of the body containing the robot from the surface to be worked according to the suctioned air flow rate, the particles of paint which do not adhere to the surface are prevented from dispersing into the environment while, at the same time, obtaining an efficient painting.

Furthermore, the apparatus according to the invention is easy to manufacture, in particular with respect to those of known type, since it uses the air naturally present inside the chamber to avoid the overspray phenomenon.

Again, the possibility of moving the robot inside the relative supporting body allows also to work very wide areas without moving the body.

The invention claimed is:

1. An apparatus (1) for the painting of hulls of boats, comprising:
    at least a robot (2) which is anthropomorphic, said robot (2) having dispensing means (3) for dispensing paint;
    at least a supporting body (4) which defines a chamber (5) for containing said robot (2) and which comprises at least an opening (6) suitable for allowing the application of the paint on a reference surface (S), said dispensing means (3) having at least three degrees of freedom inside said chamber (5), wherein said robot is completely contained inside said chamber (5), said robot moves with said chamber (5) within at least four degrees of freedom;

a means (9, 10) for handling said supporting body (4) along at least a direction of moving towards said reference surface or a direction of moving away from said reference surface, said means for handling said supporting body (4) including at least one of the group consisting of i) a lifting unit (9) that is arranged resting on a supporting surface (P) and moves the supporting body (4), in the direction of moving towards said reference surface or in the direction of moving away from said reference surface, along a lifting direction that is sloped with respect to the horizon and to the vertical, and ii) a first movement means (10) that moves the supporting body (4) with respect to the supporting surface (P), the first movement means (10) comprising a plurality of wheels that move on supporting surface (P); means (11) for suctioning air, the means for suctioning air comprising at least a suction mouth (13) associated with said supporting body (4) to form a suction stream along the entire surrounding edge of said opening (6), according to a preset suctionable air flow;

a command and control means (20) operatively connected to said means for handling said supporting body (9, 10) for controlling the movement of said supporting body (4) along said direction of moving towards said reference surface and said direction of moving away from said reference surface; and a means for detecting distance (21) associated with said body (4), the means (21) for detecting detects a distance of the surrounding edge of said opening (6) from said reference surface (S) is operatively connected to said command and control means (20), the command and control means (20) being programmed to adjust the distance of the surrounding edge of said opening (6) from said reference surface (S) so as to keep a difference between the flow rate of air entering into the area between the surrounding edge of said opening (6) and said reference surface (S) and said preset suctionable air flow below a preset value and the command and control means (20) being further programmed for i) calculating the air flow entering into the area between the body (4) and the reference surface (S) according to the distance detected by the means (21) for detecting distance, ii) calculating a difference between the calculated inlet air flow and the preset suctionable air flow and iii) modifying according the distance of the body (4) from the reference surface (S) when the calculated difference between the calculated inlet air flow and the preset suctionable air flow is bigger than the preset value.

2. The apparatus (1) according to claim 1, wherein said command and control means (20) are programmed to make the flow rate of the air entering into the area between the surrounding edge of said opening (6) and said reference surface (S) the same as said preset suctionable air flow.

3. The apparatus (1) according to claim 1, wherein said command and control means (20) comprise at least an electronic unit and at least a memory which can be preset with at least a value of the suctionable air flow by the means for suctioning air, said electronic unit being suitable for reading said predefined value of the suctionable air flow from said memory, for calculating said inlet air flow rate, for comparing said preset suctionable air flow with said calculated inlet air flow and for operating on said handling means (9, 10), for moving said body (4) along said direction of moving towards said reference surface or said direction of moving away from said reference surface so as to make the difference between said calculated inlet air flow and said preset suctionable air flow lower than a present value.

4. The apparatus (1) according to claim 3, wherein said memory comprises at least two preset values of the air flow suctionable by said means for suctioning air and that said command and control means (20) comprise interface means operatively connected to said electronic unit and usable to select manually one of said preset values.

5. The apparatus (1) according to claim 1, wherein said command and control means (20) are operatively connected to said means for suctioning air (11) to adjust the suctionable air flow depending on said selected preset value.

6. The apparatus (1) according to claim 1, wherein said suction mouth (13) is arranged along the entire surrounding edge of said opening (6).

7. The apparatus (1) according to claim 1, wherein said supporting body (4) is parallelepiped-shaped and that said opening (6) is defined on at least one of the walls (4a) of said supporting body (4).

8. The apparatus (1) according to claim 7, wherein said suction mouth (13) is arranged in correspondence to at least a section of the surrounding edge of each of the walls (4a) of said body (4) which delimit said opening (6).

9. The apparatus (1) according to claim 8, wherein said suction mouth (13) extends along the entire surrounding edge of each of the walls (4a) of said body (4) which delimit said opening (6).

10. The apparatus (1) according to claim 1, wherein the handling means (9, 10) includes at least the lifting unit (9) that is arranged resting on a supporting surface (P) and moves the body (4), in the direction of moving towards the reference surface or in the direction of moving away from the reference surface, along a lifting direction that is sloped with respect to the horizon and to the vertical.

11. The apparatus (1) according to claim 7, wherein said suction mouth (13) is defined in correspondence to the thickness of said walls (4a).

12. The apparatus (1) according to claim 7, wherein said means for suctioning air (11) comprise at least a suction duct (12) communicating with said suction mouth (13) and associated with at least one of the walls (4a) of said supporting body (4) adjacent to the wall on which said opening (6) is defined.

13. The apparatus (1) according to claim 7, wherein each of said walls (4a) has inside it an interspace (19) communicating with said suction mouth (13), where said interspace (19) defines at least in part a relative suction duct (12).

14. The apparatus (1) according to claim 12, wherein said means for suctioning air (11) comprise a plurality of said suction ducts (12) associated with each of the walls (4a) of said supporting body (4) adjacent to said opening (6).

15. The apparatus (1) according to claim 1, wherein said means for detecting distance (21) are associated with said supporting body (4) in correspondence to the surrounding edge delimiting said opening (6).

16. Apparatus (1) according to claim 14, wherein said means for detecting distance (21) are associated with said walls (4a) in correspondence to an area separate from said suction mouths (13).

17. The apparatus (1) according to claim 1, wherein said command and control means (20) are operatively connected to said dispensing means (3) and to said means for suctioning air (11) and are suitable for keeping the ratio between the flow rate of paint dispensed by said dispensing means (3) and said preset air flow within a predefined interval.

18. The apparatus (1) according to claim 1, wherein it comprises means for detecting the temperature and/or humidity inside said chamber (5) and heating means (23) arranged inside said chamber (5) and which can be started to modify the detected temperature and/or humidity.

19. The apparatus (1) according to claim 18, wherein said command and control means (20) are operatively connected to said heating means (23) and to said means for detecting the temperature and/or humidity inside said chamber (5), said command and control means (20) being programmed to modify the temperature of said heating means (23) so as to make the difference between said detected value of temperature and/or humidity and said reference value of temperature and/or humidity lower than a predefined value.

20. An apparatus (1) for the painting of hulls of boats, comprising:
- a robot (2) which is anthropomorphic, said robot having a nozzle (3) that dispenses paint;
- a supporting body (4) which defines a chamber (5) that complete contains said robot (2) and comprises an opening (6) that allows application of the paint on a reference surface (S), said nozzle (3) having at least three degrees of freedom inside said chamber (5), wherein said robot moves within said chamber (5) with at least four degrees of freedom;
- a means (9, 10) for handling said supporting body (4) along a first direction moving towards said reference surface and a second direction moving away from said reference surface, said means for handling said supporting body including i) a lifting unit (9) that rests on a supporting surface (P) and moves the supporting body (4), in the first and second directions along a lifting direction that is sloped with respect to both the horizon and the vertical, and ii) a wheeled movement unit (10) comprised of wheels (10) that moves on the supporting surface (P) to move the supporting body (4) with respect to the supporting surface (P) in the first and second directions;
- an air suction unit (11) that suctions air, the air suction unit comprising a suction mouth (13) associated with said supporting body (4) that forms a suction stream along the entire surrounding edge of said opening (6), according to a preset suctionable air flow;
- a command and control means (20) operatively connected to said handling means (9, 10), the command and control means (20) for controlling the movement of said supporting body (4) along said first and second directions; and
- a sensor (21) associated with said supporting body (4), the sensor (21) detects a distance of the surrounding edge of said opening (6) from said reference surface (S),
- wherein the sensor (21) is operatively connected to said command and control means (20),
- wherein the command and control means (20) is programmed to adjust the distance of the surrounding edge of said opening (6) from said reference surface (S) so as to keep a difference between the flow rate of air entering into the area between the surrounding edge of said opening (6) and said reference surface (S) and said preset suctionable air flow below a preset value, and
- wherein the command and control means (20) is further programmed for i) calculating the air flow entering into the area between the body (4) and the reference surface (S) according to the distance detected by the sensor (21), ii) calculating a difference between the calculated inlet air flow and the preset suctionable air flow and iii) modifying accordingly the distance of the supporting body (4) from the reference surface (S) when the calculated difference between the calculated inlet air flow and the preset suctionable air flow is bigger than the preset value.

* * * * *